United States Patent
Delle Donne

(10) Patent No.: US 11,632,937 B2
(45) Date of Patent: Apr. 25, 2023

(54) SPRAYING LEASH ASSEMBLY

(71) Applicant: Paula Delle Donne, Englewood, NJ (US)

(72) Inventor: Paula Delle Donne, Englewood, NJ (US)

(*) Notice: Subject to any disclaimer, the term of this patent is extended or adjusted under 35 U.S.C. 154(b) by 168 days.

(21) Appl. No.: 17/217,624

(22) Filed: Mar. 30, 2021

(65) Prior Publication Data

US 2022/0312743 A1    Oct. 6, 2022

(51) Int. Cl.
*A01K 27/00* (2006.01)
*A01K 15/02* (2006.01)

(52) U.S. Cl.
CPC .......... *A01K 27/004* (2013.01); *A01K 15/022* (2013.01); *A01K 27/006* (2013.01); *A01K 27/009* (2013.01)

(58) Field of Classification Search
CPC .. A01K 27/004; A01K 27/006; A01K 27/009; A01K 15/022
See application file for complete search history.

(56) References Cited

U.S. PATENT DOCUMENTS

| | | | | |
|---|---|---|---|---|
| 5,558,044 A * | 9/1996 | Nasser, Jr. | ........... | A01K 27/006 119/796 |
| 5,775,970 A * | 7/1998 | Klees | ........... | A63H 3/50 472/64 |
| 5,890,456 A * | 4/1999 | Tancrede | ........... | A01K 27/004 119/794 |
| 6,085,698 A * | 7/2000 | Klein | ........... | A41D 13/01 119/859 |
| 6,327,998 B1 * | 12/2001 | Andre | ........... | A01K 15/02 119/712 |
| 6,694,922 B2 * | 2/2004 | Walter | ........... | A01K 27/004 119/772 |
| 6,792,893 B1 * | 9/2004 | Quintero | ........... | A01K 27/004 119/796 |
| 6,886,499 B2 * | 5/2005 | Meissner | ........... | A01K 27/004 119/796 |
| 7,455,034 B2 * | 11/2008 | DiDonato | ........... | A01K 27/004 242/381.3 |
| 7,784,728 B2 * | 8/2010 | Shi | ........... | A01K 27/004 119/796 |

(Continued)

FOREIGN PATENT DOCUMENTS

DE    202005001873 U1 *   5/2005   ........... A01K 27/004
ES    2345238 A1 *   9/2010   ........... A01K 27/00

(Continued)

*Primary Examiner* — Joshua D Huson
*Assistant Examiner* — Spencer T Callaway

(57) ABSTRACT

A spraying leash assembly includes a leash unit that has a retractable leash such that the leash can be attached to a collar of a dog for walking the dog. A reservoir is coupled to the leash unit and the reservoir is hollow to contain a liquid. A spray nozzle is integrated into the reservoir to spray the fluid outwardly from the reservoir onto the dog thereby distracting the dog from barking. A light emitter is coupled to the reservoir to emit light. A handle is coupled to the reservoir and the handle can be gripped for carrying the reservoir and the leash unit. A speaker is integrated into the handle for emitting an audible sound to distract the dog from barking.

6 Claims, 6 Drawing Sheets

(56) References Cited

U.S. PATENT DOCUMENTS

| | | | | |
|---|---|---|---|---|
| 7,819,088 | B2* | 10/2010 | Stern | A01K 27/006 119/796 |
| D635,725 | S | 4/2011 | Levy | |
| 8,182,108 | B2* | 5/2012 | Pearson | A01K 27/006 119/796 |
| 8,201,964 | B2* | 6/2012 | Mattheis | A01K 27/004 119/796 |
| 9,398,756 | B2* | 7/2016 | Eckert | B05B 11/3015 |
| 10,231,434 | B2* | 3/2019 | Eckert | B05B 11/0037 |
| 10,582,700 | B2* | 3/2020 | Vilardi | A01K 27/006 |
| 11,272,687 | B2* | 3/2022 | Blanch | A01K 7/00 |
| 2004/0154557 | A1* | 8/2004 | Meissner | A01K 27/004 119/796 |
| 2005/0172914 | A1* | 8/2005 | Woodruff | A01K 27/004 119/796 |
| 2006/0162674 | A1* | 7/2006 | Neiser | A01K 27/006 119/795 |
| 2007/0131176 | A1* | 6/2007 | Jensen | A01K 27/005 119/796 |
| 2008/0105214 | A1* | 5/2008 | Moulton | A01K 1/04 119/796 |
| 2008/0173257 | A1* | 7/2008 | Steiner | A01K 27/009 119/796 |
| 2009/0277398 | A1* | 11/2009 | Shi | A01K 27/004 119/796 |
| 2010/0206246 | A1* | 8/2010 | Waldrep | A01K 27/004 119/796 |
| 2010/0302767 | A1* | 12/2010 | Mattheis | F21V 21/406 362/184 |
| 2011/0220036 | A1* | 9/2011 | Matthews | B65H 75/4431 119/796 |
| 2011/0232586 | A1* | 9/2011 | Levy | A01K 27/007 239/289 |
| 2013/0008392 | A1* | 1/2013 | Holmstrom | A01K 27/004 119/796 |
| 2014/0000533 | A1* | 1/2014 | Limberis | A01K 27/006 119/796 |
| 2014/0174377 | A1* | 6/2014 | Geller | A01K 27/004 119/796 |
| 2014/0238313 | A1* | 8/2014 | Daniels | A01K 27/004 119/796 |
| 2014/0263799 | A1* | 9/2014 | Baerwald | A01K 27/004 242/381.5 |
| 2015/0196010 | A1* | 7/2015 | Orubor | B05B 11/0086 119/797 |
| 2015/0359196 | A1* | 12/2015 | Crucs | A01K 27/009 119/796 |
| 2016/0143253 | A1* | 5/2016 | Pawlowski | A01K 27/004 119/796 |
| 2016/0157466 | A1* | 6/2016 | Gunn | A01K 27/004 119/797 |
| 2016/0317855 | A1* | 11/2016 | Rolls | A01K 27/004 |
| 2017/0071163 | A1* | 3/2017 | Glasser | A01K 7/00 |
| 2020/0267937 | A1* | 8/2020 | Pagan | B65H 75/4431 |
| 2020/0267939 | A1* | 8/2020 | Tanner | A01K 27/008 |
| 2020/0267940 | A1* | 8/2020 | Tanner | A01K 27/004 |
| 2022/0232804 | A1* | 7/2022 | Shi | B65H 75/4431 |

FOREIGN PATENT DOCUMENTS

| | | | | |
|---|---|---|---|---|
| WO | WO-2015200698 | A1* | 12/2015 | A01K 15/02 |
| WO | WO2019002647 | | 1/2019 | |
| WO | WO-2019002647 | A1* | 1/2019 | A01K 27/00 |

* cited by examiner

SPRAYING LEASH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to leash devices and more particularly pertains to a new leash device for deterring a dog from barking while being walked. The device includes a fluid reservoir and a spray nozzle for spraying a liquid onto the dog to distract the dog from barking. Additionally, the device includes a speaker which emits a distracting audible sound to deter the dog from barking.

(2) Description of Related Art Including Information Disclosed Under 37 CFR 1.97 and 1.98

The prior art relates to leash devices including a variety of dog leash devices that have a liquid sprayer integrated therein for spraying a liquid onto a dog to discourage the dog from barking. In no instance does the prior art disclose a dog leash device that combines a liquid sprayer with a speaker which emits a distracting noise to discourage a dog from barking.

BRIEF SUMMARY OF THE INVENTION

An embodiment of the disclosure meets the needs presented above by generally comprising a leash unit that has a leash retractably integrated therein such that the leash can be attached to a collar of a dog for walking the dog. A reservoir is coupled to the leash unit and the reservoir is hollow to contain a liquid. A spray nozzle is integrated into the reservoir to spray the fluid outwardly from the reservoir onto the dog thereby distracting the dog from barking. A light emitter is coupled to the reservoir to emit light outwardly therefrom. A handle is coupled to the reservoir and the handle can be gripped for carrying the reservoir and the leash unit. A speaker is integrated into the handle for emitting an audible sound outwardly therefrom to distract the dog from barking.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
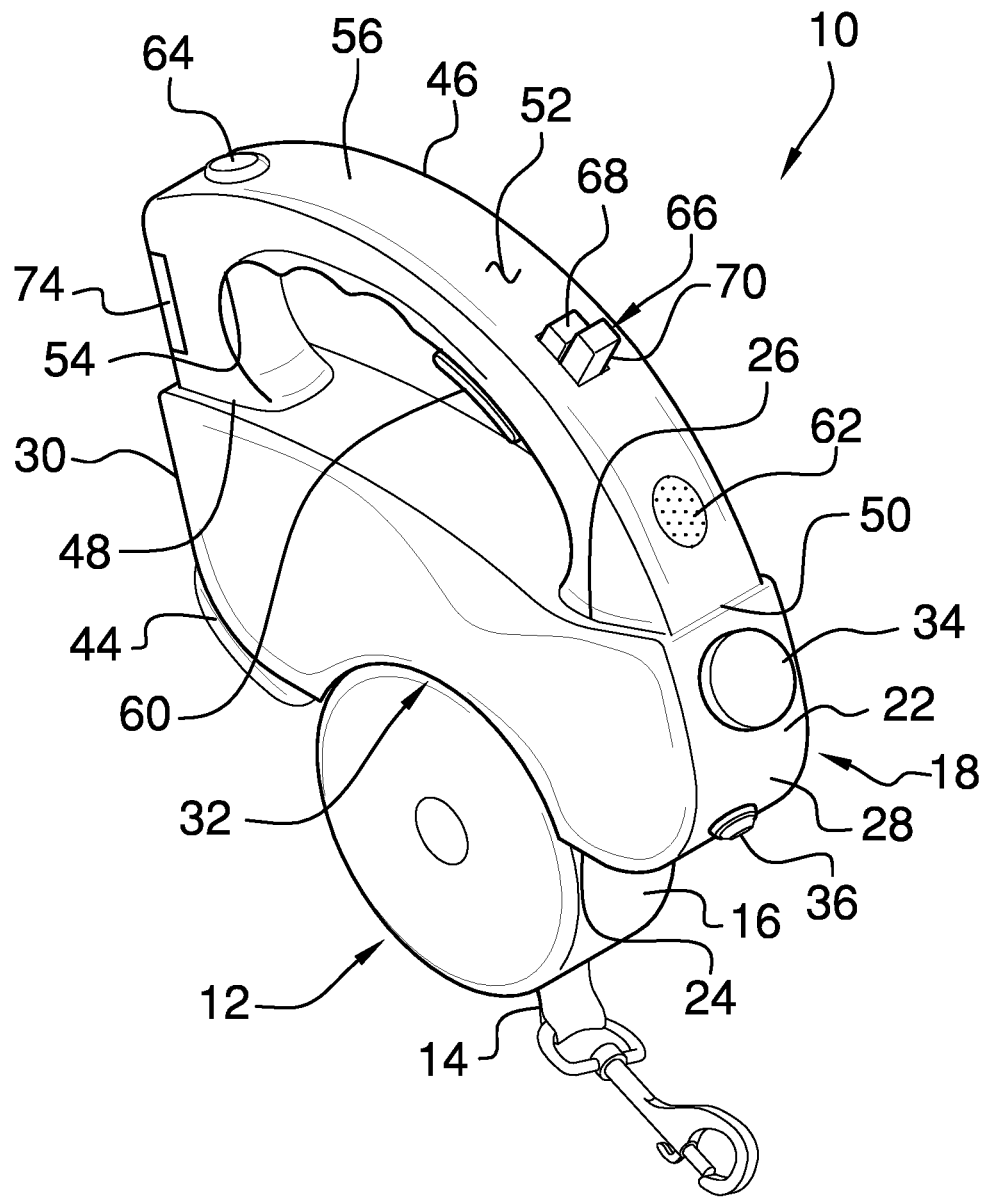
FIG. 1 is a perspective view of a spraying leash assembly according to an embodiment of the disclosure.
Figure 2:
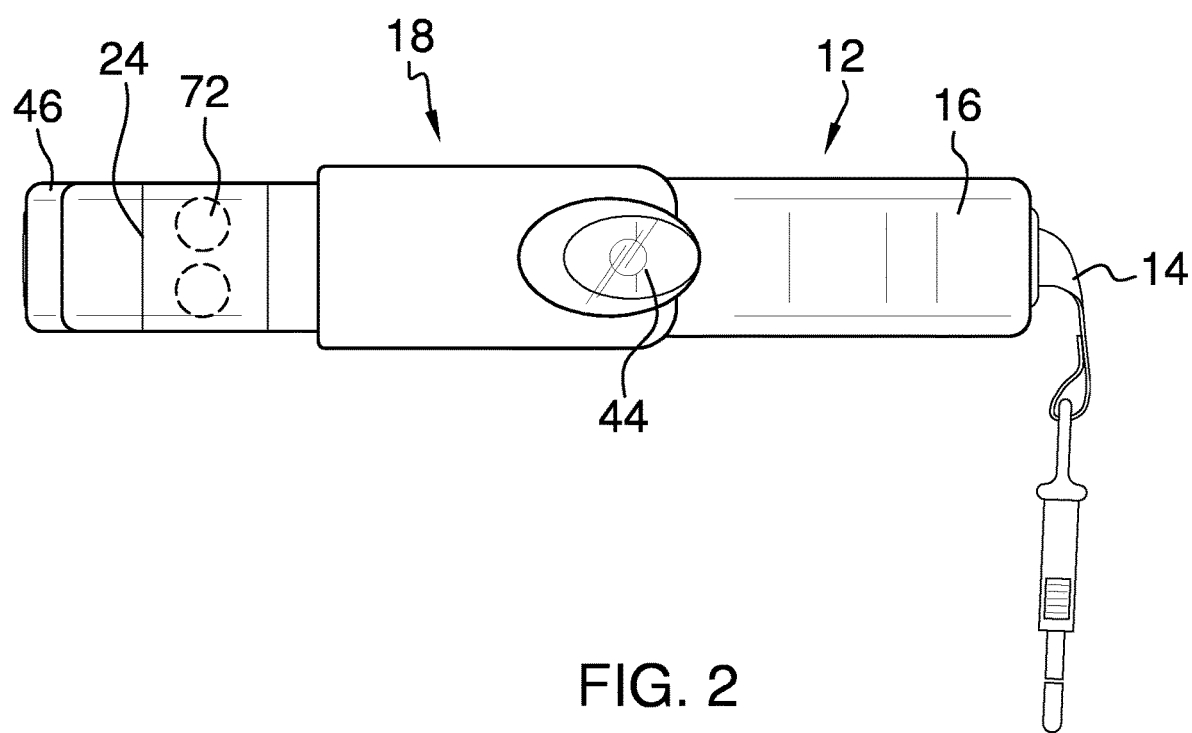
FIG. 2 is a back view of an embodiment of the disclosure.
Figure 3:
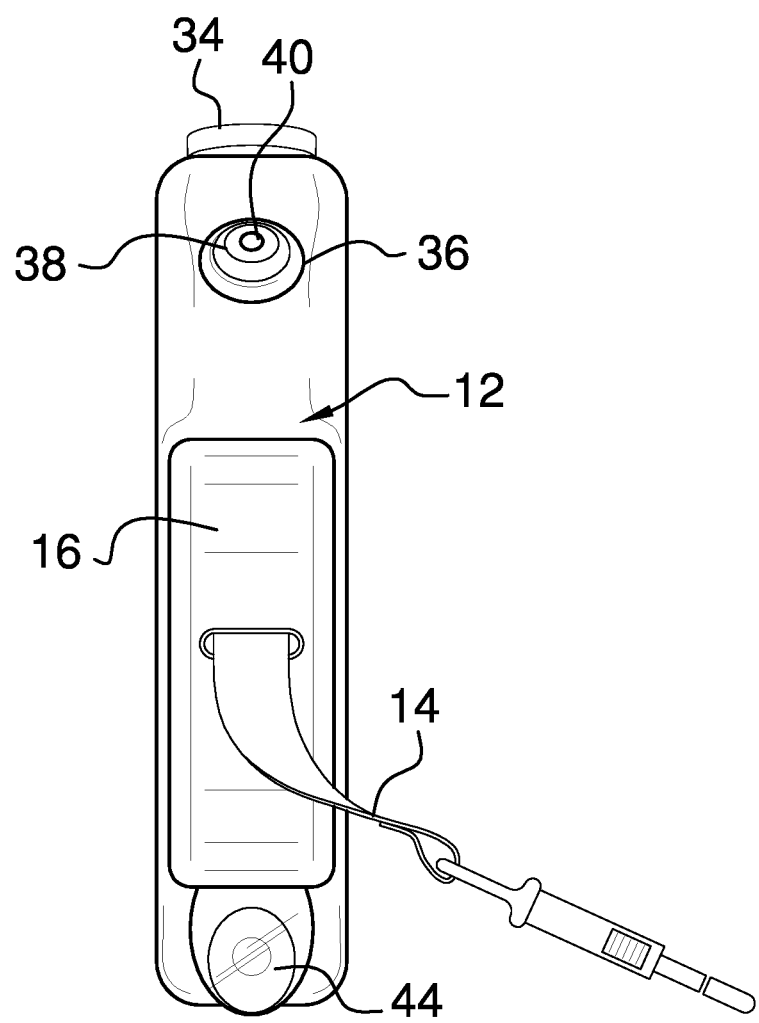
FIG. 3 is a front view of an embodiment of the disclosure.
Figure 4:
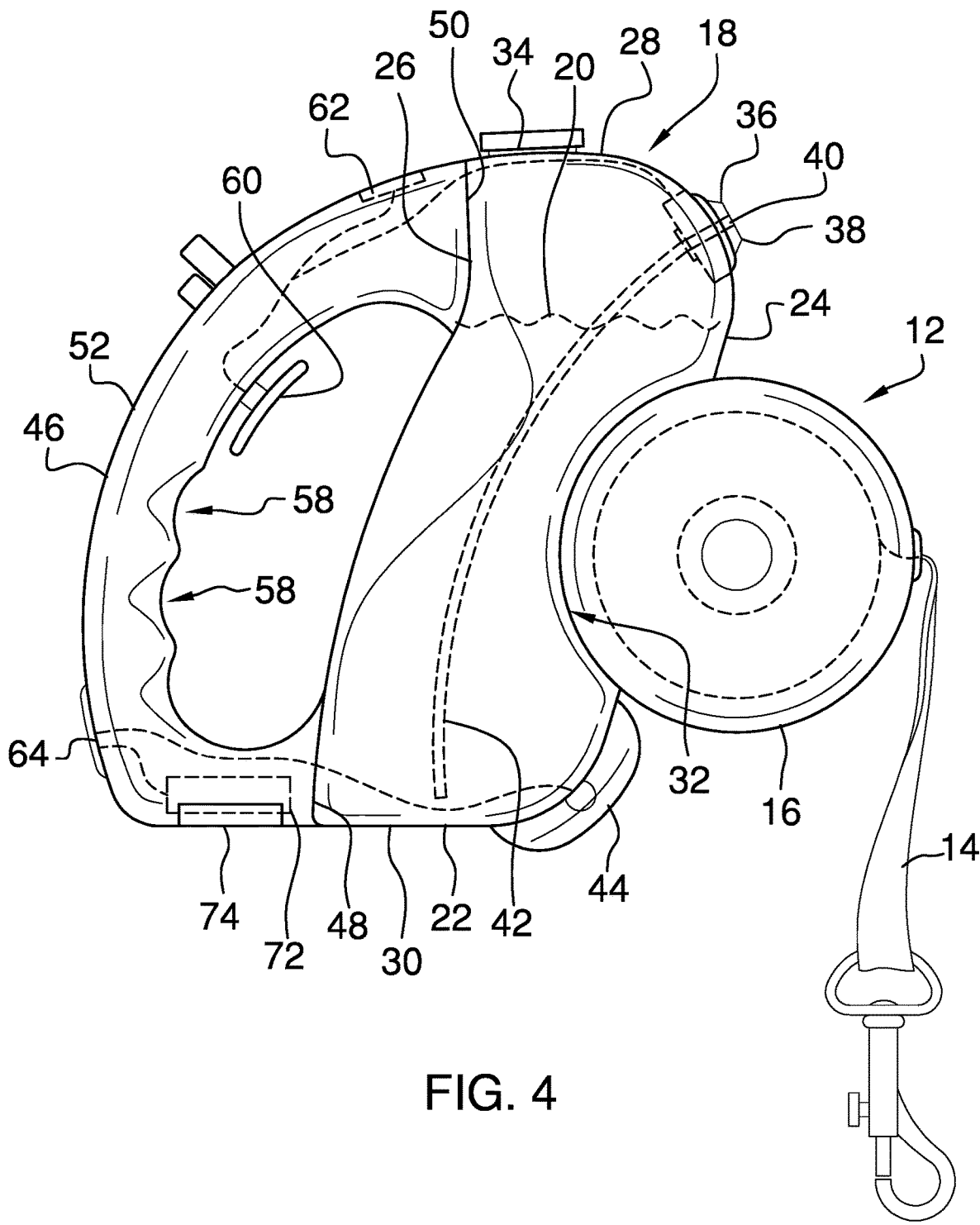
FIG. 4 is a right side phantom view of an embodiment of the disclosure.
Figure 5:
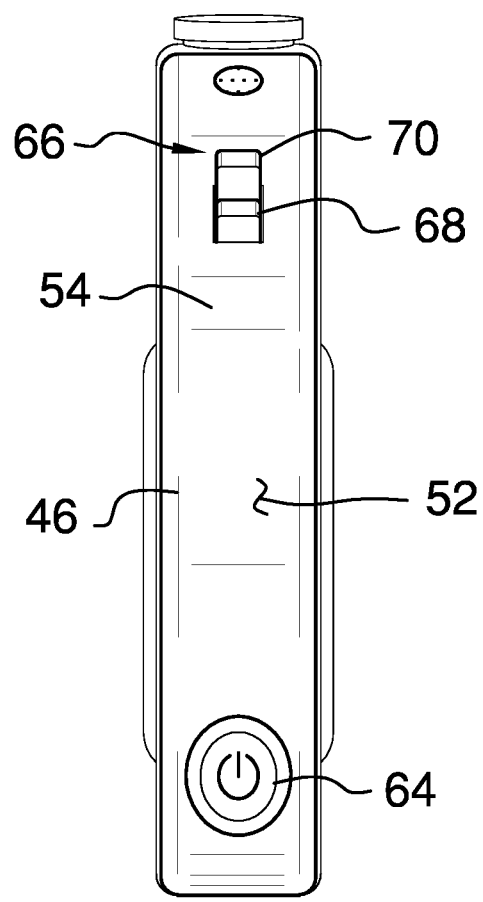
FIG. 5 is a top view of an embodiment of the disclosure.
Figure 6:
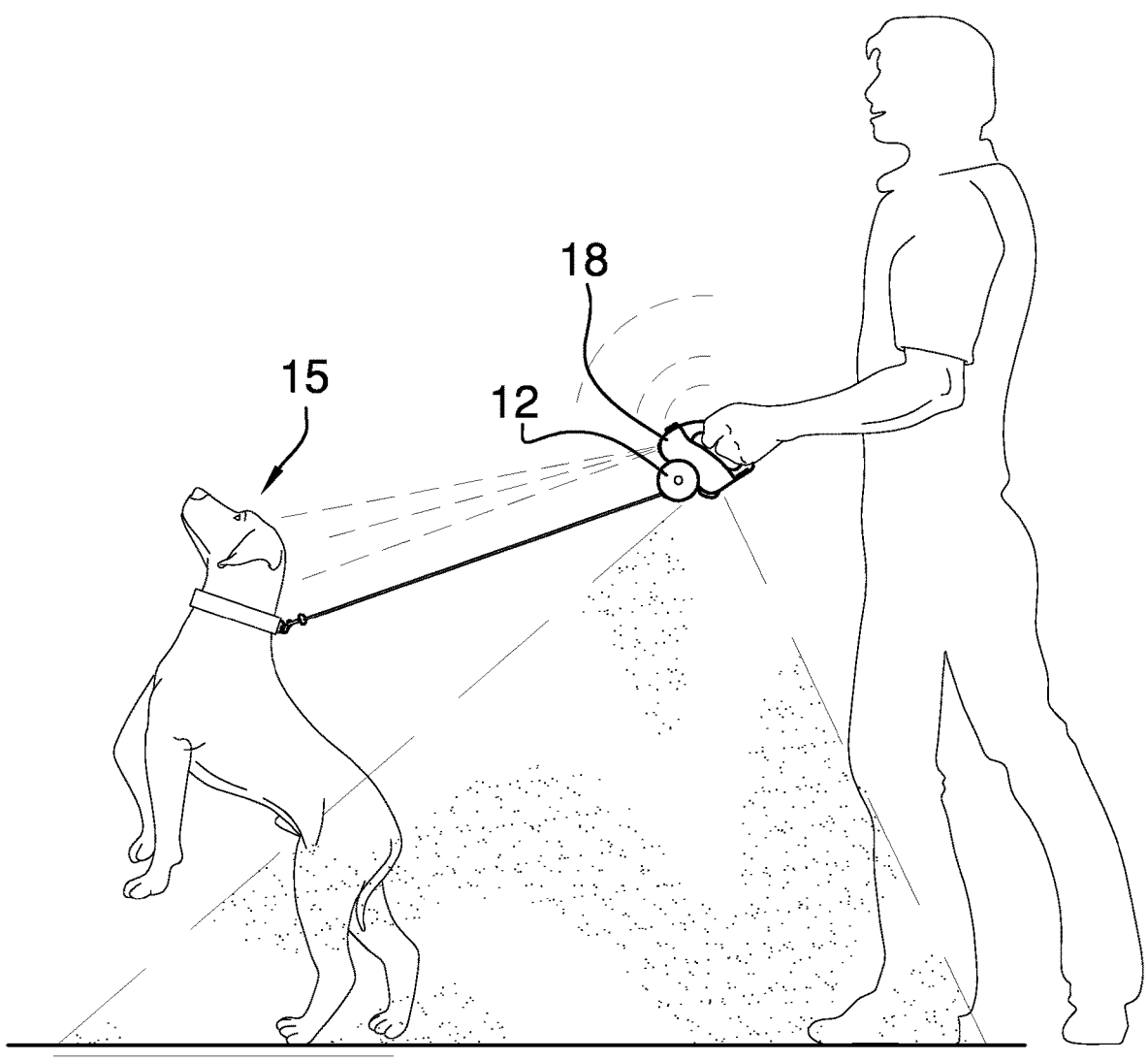
FIG. 6 is a perspective in-use view of an embodiment of the disclosure.

With reference now to the drawings, and in particular to FIGS. 1 through 6 thereof, a new leash device embodying the principles and concepts of an embodiment of the disclosure and generally designated by the reference numeral 10 will be described.

As best illustrated in FIGS. 1 through 6, the spraying leash assembly 10 generally comprises a leash unit 12 that has a leash 14 is retractably integrated therein for attaching to a collar of a dog 15 for walking the dog 15. The leash unit 12 has an outer wall 16 and the outer wall 16 is continuously arcuate about a center point of the leash unit 12 such that the leash unit 12 has a cylindrical shape. A reservoir 18 is coupled to the leash unit 12 and the reservoir 18 is hollow to contain a liquid 20, such as water or other non toxic liquid.

The reservoir 18 has an outside wall 22 and the outside wall 22 has a lower side 24, an upper side 26, a front side 28 and a back side 30. The lower side 24 has a recess 32 curving upwardly toward the upper side 26 and the leash unit 12 is positioned in the recess 32 having the outer wall 16 of the leash unit 12 abutting the lower side 24 defining the recess 32. The front side 28 has a fill port 34 extending into an interior of the reservoir 18 to facilitate the reservoir 18 to be filled. A spray nozzle 36 is integrated into the reservoir 18 for spraying the fluid outwardly from the reservoir 18 onto the dog 15 thereby distracting the dog 15 from barking. The spray nozzle 36 is positioned on the front side 28 of the outside wall 22 of the reservoir 18, the spray nozzle 36 has a distal end 38 with respect the front side 28 and the distal end 38 has an opening 40 extending into an interior of the reservoir 18. An intake tube 42 is fluidly coupled to the spray nozzle 36 and the intake tube 42 extends into an interior of the reservoir 18 such the intake tube 42 is submerged in the fluid contained in the reservoir 18.

A light emitter 44 is coupled to the reservoir 18 to emit light outwardly therefrom, and the light emitter 44 is positioned on the back side 30 of the outside wall 22 of the reservoir 18. Additionally, the light emitter 44 may comprise a light emitting diode or other type of electronic light emitter 44. A handle 46 is coupled to the reservoir 18 such that the handle 46 can be gripped for carrying the reservoir 18 and the leash unit 12. The handle 46 has a first end 48, a second end 50 and an outer surface 52 extending between the first end 48 and the second end 50. Moreover, the handle 46 is curved between the first end 48 and the second end 50 such that the first end 48 is spaced from the second end 50. Each of the first end 48 and the second end 50 is coupled to the upper side 26 of the outside wall 22 of the reservoir 18 such that the handle 46 curves upwardly from the upper side 26.

The outer surface 52 of the handle 46 has a bottom side 54 and a top side 56, and the bottom side 54 of the outer surface 52 has a plurality of depressions 58 each extending toward the top side 56 of the outer surface 52 to enhance gripping the handle 46. Additionally, the depressions 58 are spaced apart from each other and are distributed along a partial length of the bottom side 54. A spray button 60 is movably integrated into the handle 46 such that the spray button 60 can be manipulated by a user. The spray button 60 is in communication with the spray nozzle 36 for actuating the spray nozzle 36 to spray the fluid outwardly from the spray nozzle 36, and the spray button 60 is positioned on the bottom side 54 of the outer surface 52 of the handle 46.

A speaker 62 is integrated into the handle 46 to emit an audible sound outwardly therefrom to distract the dog 15 from barking. The audible sound may be a human voice making a "psst psst" sound or other sound known to discourage unwanted behavior in the dog 15. The speaker 62 is positioned on the top side 56 of the outer surface 52 of the handle 46, and the speaker 62 is positioned closer to the second end 50 of the handle 46 than the first end 48 of the handle 46. Additionally, the speaker 62 may comprise an electronic speaker or the like. As is most clearly shown in FIG. 4, the speaker 62 may be electrically coupled to the spray button 60 such that the speaker 62 is turned on when the spray button 60 is depressed.

An actuate button 64 is movably integrated into the handle 46 such that the actuate button 64 can be manipulated by the user. The actuate button 64 may be electrically coupled to each of the light emitter 44 and the speaker 62. Additionally, each of the light emitter 44 and the speaker 62 may be turned on when the actuate button 64 is depressed into an on position. The actuate button 64 is biased into an off position and each of the light emitter 44 and the speaker 62 may be turned off when the actuate button 64 is in the off position. The actuate button 64 is positioned on the top side 56 of the outer surface 52 of the handle 46.

A plurality of leash buttons 66 is each movably integrated into the handle 46 such that each of the leash buttons 66 can be manipulated by a user. Each of the leash buttons 66 is in communication with the leash unit 12. A release one of the leash buttons 68 facilitates the leash 14 to be drawn outwardly from the leash unit 12 when the release leash 14 button is depressed. A secure one of the leash buttons 70 inhibits the leash 14 from being drawn outwardly or retracted into the leash unit 12 when the secure leash 14 button is depressed. The leash unit 12 is biased to retract the leash 14 into the leash unit 12 when neither the release leash button 68 or the secure leash button 70 is depressed. A power supply 72 is positioned in the handle 46, the power supply 72 is electrically coupled to the actuate button 64 and the power supply 72 comprises at least one battery. A battery cover 74 is removably coupled to the top side 56 of the outer surface 52 of the handle 46, and the battery cover 74 is positioned adjacent to the first end 48 of the handle 46.

In use, the spray button 60 is depressed the spray the fluid onto the dog 15 when the dog 15 barks when the dog 15 is being walked. In this way the dog 15 is distracted from barking in order to correct the unwanted behavior of the dog 15. Additionally, the actuate button 64 is depressed to actuate the speaker 62 to emit the audible sound to distract the dog 15 from barking. In this way the dog 15 can be distracted from barking by being sprayed with the liquid 20, by hearing the audible sound or by both. Thus, the dog 15 can be trained to avoid barking while being walked.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A spraying leash assembly for spraying water and emitting a discouraging noise to discourage a dog from barking while being walked, said assembly comprising:

a leash unit having a leash being retractably integrated therein wherein said leash is configured to be attached to a collar of a dog for walking the dog, said leash unit having an outer wall, said outer wall being continuously arcuate about a center point of said leash unit such that said leash unit has a cylindrical shape;

a reservoir being coupled to said leash unit, said reservoir being hollow wherein said reservoir is configured to contain a liquid, said reservoir having an outside wall, said outside wall having a lower side, an upper side, a front side and a back side, said lower side having a recess curving upwardly toward said upper side, said leash unit being positioned in said recess having said outer wall of said leash unit abutting said lower side defining said recess and extending outwardly away from the leash unit wherein said outside wall is exposed extending from said leash unit, said front side having a fill port extending into an interior of said reservoir wherein said fill port is configured to facilitate said reservoir to be filled;

a spray nozzle being integrated into said reservoir wherein said spray nozzle is configured to spray the fluid outwardly from said reservoir onto the dog thereby distracting the dog from barking;

a light emitter being coupled to said reservoir wherein said light emitter is configured to emit light outwardly therefrom;

a handle being coupled to said reservoir wherein said handle is configured to be gripped for carrying said reservoir and said leash unit; and a speaker being integrated into said handle wherein said speaker is configured to emit an audible sound outwardly therefrom such that the audible sound is configured to distract the dog from barking.

2. The assembly according to claim 1, wherein:

said spray nozzle is positioned on said front side of said outside wall of said reservoir, said spray nozzle having a distal end with respect said front side, said distal end having an opening extending into an interior of said reservoir; and said assembly includes an intake tube being fluidly coupled to said spray nozzle, said intake tube extending into an interior of said reservoir wherein said intake tube is configured to be submerged in the fluid contained in said reservoir.

3. The assembly according to claim 1, wherein said handle has a first end, a second end and an outer surface extending between said first end and said second end, said handle being curved between said first end and said second end such that said first end is spaced from said second end, each of said first end and said second end being coupled to said upper side of said outside wall of said reservoir such that said handle curves upwardly from said upper side, said outer surface of said handle having a bottom side and a top side, said bottom side of said outer surface having a plurality of depressions each extending toward said top side of said outer surface wherein said plurality of depressions is configured to enhance gripping said handle, said depressions being spaced apart from each other and being distributed along a partial length of said bottom side.

4. The assembly according to claim 3, further comprising a spray button being movably integrated into said handle wherein said spray button is configured to be manipulated by a user, said spray button being in communication with said spray nozzle for actuating said spray nozzle wherein said spray nozzle is configured to spray the fluid outwardly from said spray nozzle, said spray button being positioned on said bottom side of said outer surface of said handle.

5. The assembly according to claim 3, further comprising an actuate button being movably integrated into said handle wherein said actuate button is configured to be manipulated by the user, said actuate button being electrically coupled to each of said light emitter and said speaker, each of said light emitter and said speaker being turned on when said actuate button is depressed into an on position, said actuate button being biased into an off position, each of said light emitter and said speaker being turned off when said actuate button is in said off position, said actuate button being positioned on said top side of said outer surface of said handle.

6. A spraying leash assembly for spraying water and emitting a discouraging noise to discourage a dog from barking while being walked, said assembly comprising:

a leash unit having a leash being retractably integrated therein wherein said leash is configured to be attached to a collar of a dog for walking the dog, said leash unit having an outer wall, said outer wall being continuously arcuate about a center point of said leash unit such that said leash unit has a cylindrical shape;

a reservoir being coupled to said leash unit, said reservoir being hollow wherein said reservoir is configured to contain a liquid, said reservoir having an outside wall, said outside wall having a lower side, an upper side, a front side and a back side, said lower side having a recess curving upwardly toward said upper side, said leash unit being positioned in said recess having said outer wall of said leash unit abutting said lower side defining said recess and extending outwardly away from the leash unit wherein said outside wall is exposed extending from said leash unit, said front side having a fill port extending into an interior of said reservoir wherein said fill port is configured to facilitate said reservoir to be filled;

a spray nozzle being integrated into said reservoir wherein said spray nozzle is configured to spray the fluid outwardly from said reservoir onto the dog thereby distracting the dog from barking, said spray nozzle being positioned on said front side of said outside wall of said reservoir, said spray nozzle having a distal end with respect said front side, said distal end having an opening extending into an interior of said reservoir;

an intake tube being fluidly coupled to said spray nozzle, said intake tube extending into an interior of said reservoir wherein said intake tube is configured to be submerged in the fluid contained in said reservoir;

a light emitter being coupled to said reservoir wherein said light emitter is configured to emit light outwardly therefrom, said light emitter being positioned on said back side of said outside wall of said reservoir;

a handle being coupled to said reservoir wherein said handle is configured to be gripped for carrying said reservoir and said leash unit, said handle having a first end, a second end and an outer surface extending between said first end and said second end, said handle being curved between said first end and said second end such that said first end is spaced from said second end, each of said first end and said second end being coupled to said upper side of said outside wall of said reservoir such that said handle curves upwardly from said upper side, said outer surface of said handle having a bottom side and a top side, said bottom side of said outer surface having a plurality of depressions each extending toward said top side of said outer surface wherein said plurality of depressions is configured to enhance gripping said handle, said depressions being spaced apart from each other and being distributed along a partial length of said bottom side;

a spray button being movably integrated into said handle wherein said spray button is configured to be manipulated by a user, said spray button being in communication with said spray nozzle for actuating said spray nozzle wherein said spray nozzle is configured to spray the fluid outwardly from said spray nozzle, said spray button being positioned on said bottom side of said outer surface of said handle;

a speaker being integrated into said handle wherein said speaker is configured to emit an audible sound outwardly therefrom such that the audible sound is configured to distract the dog from barking, said speaker being positioned on said top side of said outer surface of said handle, said speaker being positioned closer to said second end of said handle than said first end of said handle;

an actuate button being movably integrated into said handle wherein said actuate button is configured to be manipulated by the user, said actuate button being electrically coupled to each of said light emitter and said speaker, each of said light emitter and said speaker being turned on when said actuate button is depressed into an on position, said actuate button being biased into an off position, each of said light emitter and said speaker being turned off when said actuate button is in said off position, said actuate button being positioned on said top side of said outer surface of said handle; and a power supply being positioned in said handle, said power supply being electrically coupled to said actuate button, said power supply comprising at least one battery.

* * * * *